(12) United States Patent
Daly et al.

(10) Patent No.: US 6,412,752 B1
(45) Date of Patent: Jul. 2, 2002

(54) POWER BLADE FOR THROTTLE ASSEMBLY

(75) Inventors: Paul D. Daly, Troy, MI (US); James K. Vanderveen, Blenheim (CA); Bruce J. Harvey, Shelby Township, MI (US); Zhouxuan Xia, Windsor (CA)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/657,753

(22) Filed: Sep. 8, 2000

Related U.S. Application Data

(60) Provisional application No. 60/152,911, filed on Sep. 8, 1999.

(51) Int. Cl.[7] .............................................. F16K 31/02
(52) U.S. Cl. ................................. 251/129.11; 123/337
(58) Field of Search ........................ 251/129.04, 129.11, 251/129.12, 129.13; 123/399, 361, 337

(56) References Cited

U.S. PATENT DOCUMENTS

| 5,195,719 | A | * | 3/1993 | Ball et al. ....................... 251/56 |
| 5,431,141 | A | | 7/1995 | Kanazawa |
| 5,452,697 | A | * | 9/1995 | Sasaki et al. ................ 123/399 |
| 5,517,966 | A | | 5/1996 | Kanazawa |
| 5,664,542 | A | | 9/1997 | Kanazawa |
| 5,957,428 | A | * | 9/1999 | Yokota ........................ 251/305 |

FOREIGN PATENT DOCUMENTS

| DE | 3905901 A1 | 8/1990 |
| DE | 4223933 A1 | 1/1994 |
| DE | 4323785 A1 | 1/1994 |
| DE | 4401585 A1 | 7/1995 |
| DE | 4441856 A1 | 5/1996 |
| FR | 2599805 A1 | 4/1987 |

OTHER PUBLICATIONS

English abstract translation for DE 004223933A1 to Norgauer, Jan. 27, 1994.*

* cited by examiner

Primary Examiner—William C. Doerrler
Assistant Examiner—Patrick Buechner

(57) ABSTRACT

A method and apparatus is provided for driving a throttle blade about an axis of rotation between maximum and minimum airflow positions. The throttle assembly includes a throttle body with an airflow passage. The throttle blade is mounted for rotation with respect to the body between the maximum and minimum airflow positions. The throttle blade has a central bore for receiving at least a portion of a drive mechanism. The drive mechanism includes a motor operably connected to a gear drive to move the throttle blade between the maximum and minimum airflow positions. In one example, the drive mechanism is preassembled in a tube that is inserted into the blade bore during assembly. A position sensor is also mounted within the bore to monitor the position of the blade relative to the body.

20 Claims, 3 Drawing Sheets

POWER BLADE FOR THROTTLE ASSEMBLY

RELATED APPLICATION

This application claims priority to provisional application No. 60/152,911 filed on Sep. 8, 1999.

BACKGROUND OF THE INVENTION

1. Field of the Invention

This invention relates to a method and apparatus for rotating a throttle blade on a throttle shaft between maximum and minimum airflow positions. Specifically, at least a portion of a drive assembly is mounted within the throttle blade to move the blade between various airflow positions.

2. Related Art

Throttle valves typically include a throttle blade or disc attached to a throttle shaft, which extends across a bore formed in a throttle body. The throttle blade rotates within the bore to control air flow from an intake manifold to a vehicle engine. A pair of bearings is supported by the throttle body to facilitate rotation of the throttle shaft.

A mechanical linkage or motor and geardrive are typically mounted to one side of the throttle body to provide the power necessary to rotate the throttle blade within the throttle body. In embodiments with a motor, a position sensor is mounted to the throttle body to monitor the position of the shaft within the bore. Multiple assembly operations are required to assemble the various components. The bearings are installed within the throttle body, the shaft is assembled into the throttle body, the blade is mounted to the shaft, the motor and geardrive or mechanical linkage are mounted to the body, and the position sensor is mounted to the body. This assembly process is labor intensive and time consuming.

Another disadvantage with this assembly process is that mounting the position sensor, motor, and geardrive on the throttle body takes up valuable packaging space. Thus, it is desirable to provide an improved drive mechanism and position sensor in a more modular form that is easy to install, and which overcomes the deficiencies with prior art systems.

SUMMARY OF THE INVENTION

The subject invention provides a drive assembly that is at least partially mounted within a throttle blade for controlling the rotational movement of the blade within a throttle body. A position sensor preferably is also provided to monitor the position of the blade relative to the throttle body. The mounting of at least a portion of the drive assembly within the blade eliminates the need to provide separate exterior mounting of such components on the throttle body. This provides a more modular design that decreases assembly time and cost.

In a disclosed embodiment of this invention, a throttle assembly includes a throttle body with an airflow passage defining a longitudinal axis and having a bore intersecting the airflow passage. The bore defines an axis of rotation that is transverse to the longitudinal axis. A throttle blade is mounted for rotation about the axis of rotation defined by the bore. The blade rotates within the airflow passage between a maximum airflow position and a minimum airflow position. A drive mechanism is supported within the throttle blade to move the blade between the maximum and minimum airflow positions.

In a preferred embodiment, the blade has a central bore that houses the drive mechanism. A position sensor can optionally be mounted within the bore to monitor the position of the blade and for generating a signal representing the blade position that can be utilized by an electronic throttle control system.

The inventive method for driving the throttle blade between maximum and minimum airflow positions includes the following steps. The throttle body is provided with an airflow passage defining a longitudinal axis and a rotation axis intersecting the airflow passage. A throttle blade is mounted for rotation about the axis of rotation. A drive mechanism is secured to the throttle blade and the blade is driven between the maximum and minimum airflow positions by the drive mechanism. Additional steps include forming a central bore within the blade and installing the drive mechanism within the bore and mounting a position sensor within the bore to monitor the position of the blade relative to the throttle body.

These and other features of the present invention can be best understood from the following specification and drawings, the following of which is a brief description.

DETAILED DESCRIPTION OF AN EXEMPLARY EMBODIMENT

Figure 4:
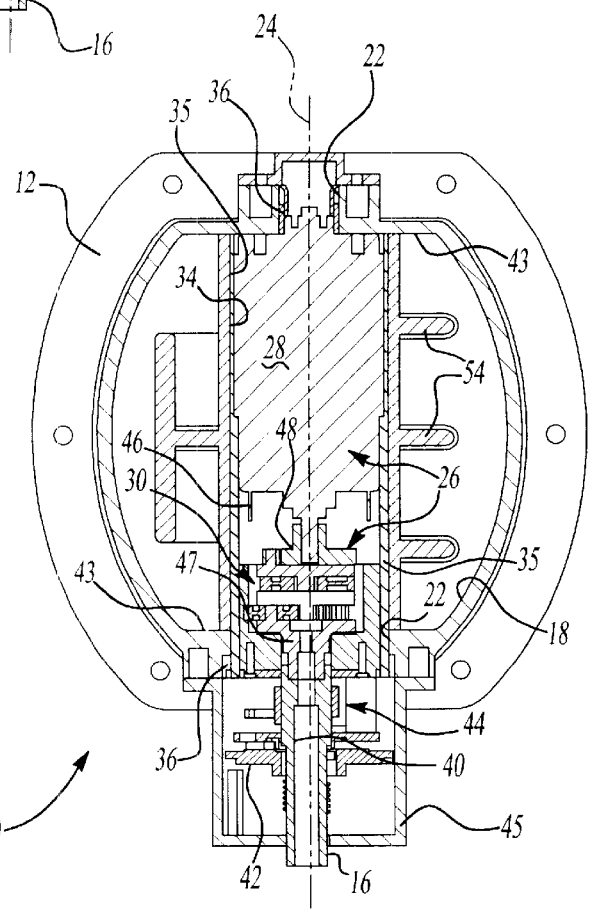
FIG. 4 shows the components of FIG. 3 from another perspective.

A throttle assembly 10 includes a throttle body 12, a throttle disc or blade 14 and a shaft 16 (FIG. 4). Throttle body 12 has an airflow passage 18 that defines a longitudinal axis 20. The throttle blade 14 rotates within the passage 18 to control air flow from an intake manifold to a vehicle engine (not shown).

The body 12 also includes a transversely extending bore 22 (FIG. 4) that intersects the airflow passage 18. The bore 22 defines an axis of rotation 24 that is transverse to the longitudinal axis 20. Although a straight passage 18 is shown, a contoured passage as known in the art is useful with this invention.

Figure 1:
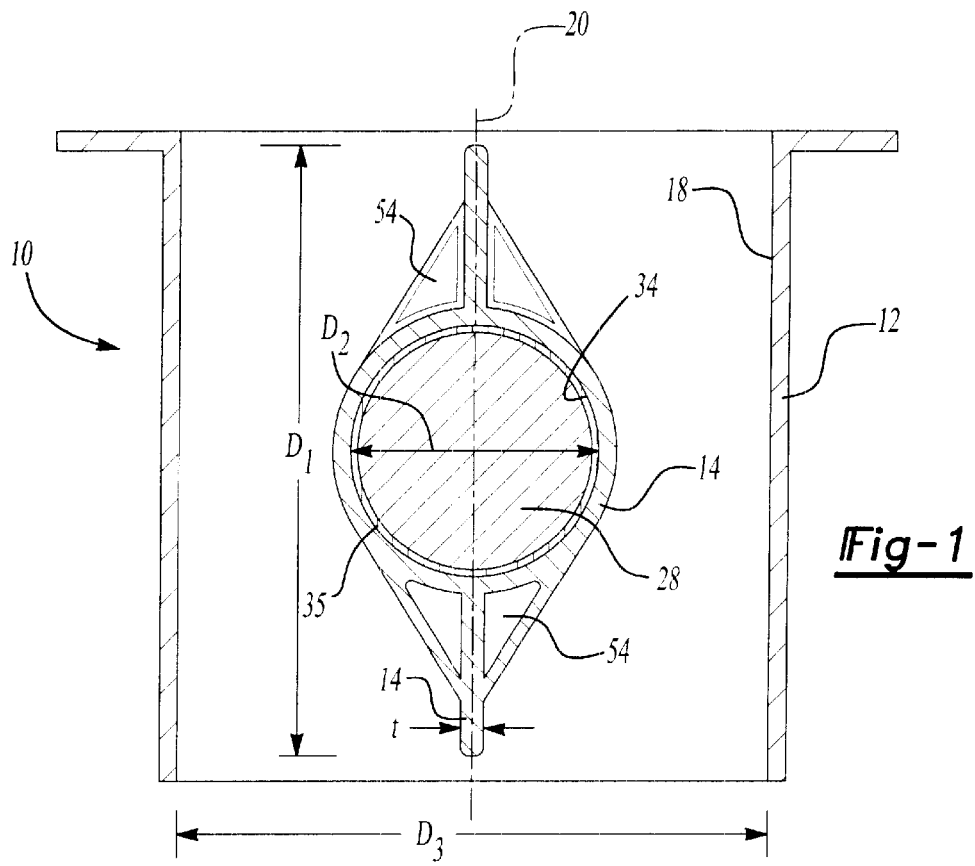
FIG. 1 is side schematic view of a throttle assembly with a throttle blade incorporating the subject invention in the maximum airflow position.
Figure 2:
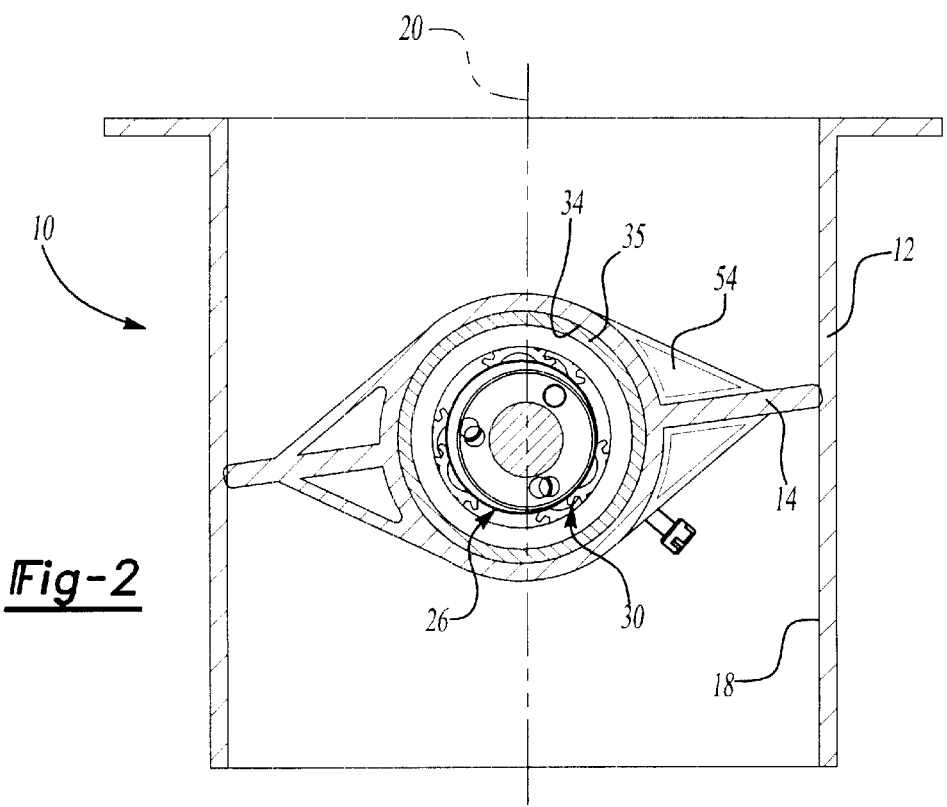
FIG. 2 is a view similar to FIG. 1 but showing more details of the throttle blade which is shown in the minimum airflow position.

The throttle shaft 16 is supported by the housing 12 such that the shaft 16 remains stationary, i.e., there is no relative motion between the shaft 16 and the housing 12. The throttle blade 14 is supported by the housing 12 for rotation about the axis of rotation 24 and within the airflow passage 18. The blade 14 rotates between a maximum airflow position, shown in FIG. 1 where a maximum amount of air is permitted to flow through passage 18, and a minimum airflow position, shown in FIG. 2 where a minimum amount of air is permitted to flow through passage 18.

A drive mechanism 26 is secured to the throttle blade 14 for moving the throttle blade 14 between the maximum and minimum airflow positions. The preferred drive mechanism 26 is shown in greater detail in FIGS. 3 and 4. The drive mechanism 26 includes a motor 28 and a geardrive or gearbox 30. The motor 28 drives the gearbox 30 to rotate the blade 14 with respect to the shaft 16 and the housing 12.

The throttle blade 14 preferably has a predetermined Geometry and dimension D1 and a thickness "T". The dimension D1 most preferably is established to conform to the opening 18 using the thermoforming technique described in U.S. Pat. No. 5,902,426, issued May 11, 1999. The teachings of that patent are incorporated into this specification by reference.

The blade central bore 34 has a predetermined dimension D2 that extends along the blade in one direction. A cylindrical tube 35 preferably is received within the bore 34. Preferably at least one bearing assembly or bushing 36 is provided to rotatably support the blade 14 with respect to the housing 12 and the shaft 16. In one embodiment, a first bearing assembly 36 is mounted at one end of the assembly and a second bearing assembly 36 is mounted at an opposite end. In the illustrated embodiment, one bearing 36 fits between tube 35 and the housing 12 while the other bearing 36 is between an end of the motor 28 and the housing 12.

The drive mechanism 26 preferably is supported in the tube 35 and is mounted within the bore 34 to provide a compact, modular assembly. Preferably the motor 28 and the gearbox 30 are aligned on the axis 24. Although the illustrated example includes housing the entire motor 28 and the entire gear assembly 30 within the central bore 34 of the throttle blade 14, it is within the scope of this invention to have a portion of one or more of the drive mechanism components extending outside of the blade central bore 34 along the axis 24. Additionally, it is preferred that the components supported on the blade be housed within the bore 34 for maximum airflow control, however, those skilled in the art who have the benefit of this description may realize that other arrangements for supporting at least a portion of the drive mechanism on the blade are possible. Of course, such modifications are within the scope of this invention.

In the preferred embodiment, a position sensor 42 is mounted to detect movement of the blade 14 for monitoring the position of the blade 14 relative to the shaft 16 and/or the housing 12. A spring assembly 44 having a predetermined load is mounted between the position sensor 42 and the gearbox 30. The spring 44 ensures automatic closing of the blade 14 in the event of motor de-activation. The spring 44 preferably has a calibrated stop to operate to ensure that the blade 14 can be made to automatically stop at a slightly open position if desired.

Any type of position sensor known in the art can be used to determine the blade position including a thick film potentiometer with current supplied via flex cables or slip rings or a sensor having current supplied via radio frequency (RF) or inductive circuitry. Thus, any contact or non-contact type sensor could be used. In the illustrated example, a conductor 40 extending through the shaft 16 provides a communication link for sensor signals and provides power to the sensor 42. The motor 28 includes leads 46 that make electrical contact with the tube 35. Preferably, the tube 35 is conductive and carries power to the motor 28.

The method for driving the throttle blade 14 between maximum and minimum airflow positions includes the following steps. The blade 14 is mounted for rotation about the axis of rotation 24. The blade 14 is inserted into the passage 18 and oriented using guide surfaces 43, which ensure that the bore 34 will be appropriately positioned to complete the assembly. The drive mechanism 26 is at least partially secured to the throttle blade 14. In the illustrated example, the motor 28 and the gear assembly 30 are preassembled and loaded within the tube 35. During assembly, the preloaded tube 35 is inserted into the bore 34. A proper mechanical connection between the shaft 16 and the gear assembly 30 preferably is established prior to inserting the tube 35 into the bore 34. Alternatively, the shaft 16 is appropriately connected after tube insertion. A cap 45 is provided to seal off the completed assembly and to fix the shaft 16 relative to the body 12.

The modular nature of the inventive arrangement greatly simplifies the assembly operation compared to conventional designs. The ability to easily insert the entire drive mechanism into the blade 14 (or at least selected portions of the drive assembly 26) enhances the economies associated with manufacturing throttle assemblies. The inventive arrangement also provides a more compact design that enhances packaging economies of a vehicle.

The throttle blade 14 is preferably made from a plastic material and includes an enlarged center section. Preferably, a plurality of ribs 54, shown in FIGS. 4, 1, and are formed along the exterior surface of the blade 14 and are orientated transverse to the axis of rotation 24. The enlarged center section is a hollow section that defines the central bore 34. The drive mechanism 26 preferably is mounted within the bore 34 preferably includes a small electric motor 28 and gearbox 30 of the epicyclic type, shown in FIG. 5. The motor 28 and gearbox 30 are arranged so that the application of a current to the motor terminal via an electrical connection 46 well known in the art, results in rotary motion of the blade 14 on the axis 24 which is parallel to motor's axis of rotation. The motor polarity is arranged so that current in one direction produces blade rotation in one direction and current in an opposite direction produces blade rotation in an opposite direction. The blade 14 and motor 28 include bearings so that the entire assembly can be rotatably mounted into the throttle body 12.

Figure 5:
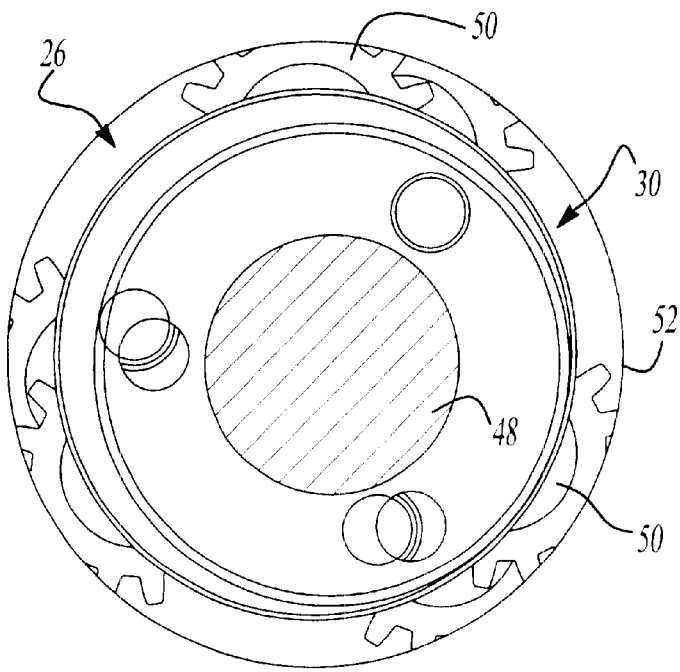
FIG. 5 is a schematic view of a gear assembly useful with this invention.

One embodiment of the motor 28 and gearbox 30 is shown in FIG. 5. The motor 28 has an output plate 48 that drives a plurality of gears 50. The output plate 48 acts like a sun gear that drives the planet gears 50. The planet gears 50 are in driving engagement with a ring gear 52. The gearbox 30 and gears 50, 52 are arranged so that the motor shaft torque is amplified. The amplification ratio will be typically in the range of 10:1 to 30:1, however other amplification ratios could also be used depending on the application.

Figure 6:
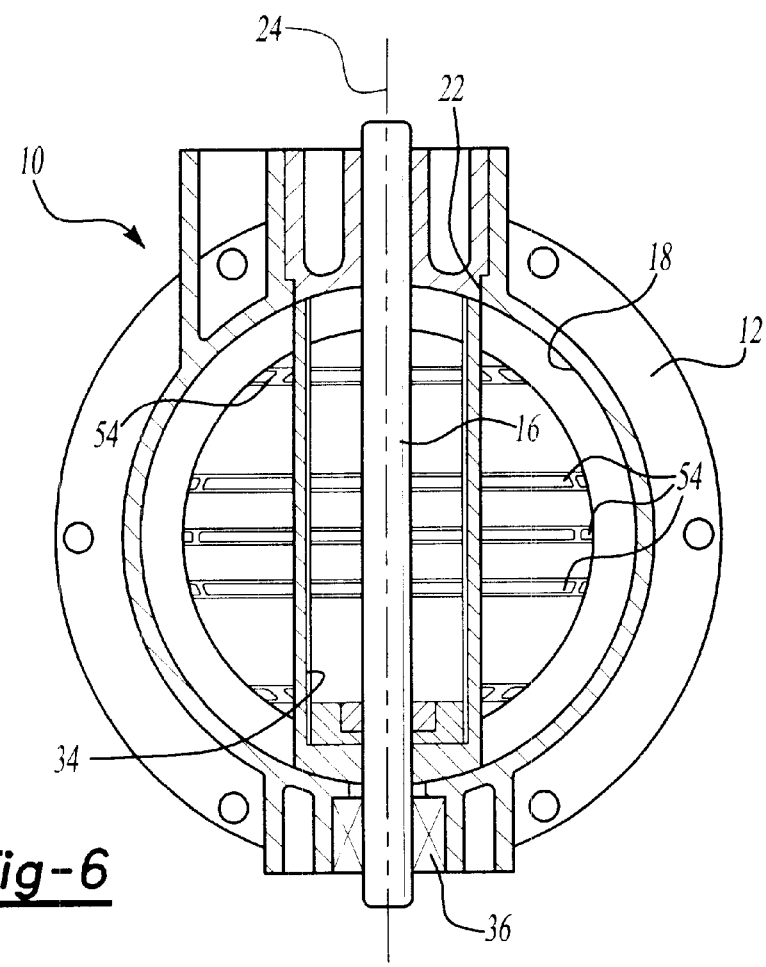
FIG. 6 illustrates another example embodiment of this invention.

FIG. 6 shows an alternative embodiment. In this example, the shaft 16 extends through a bore 22 in the throttle body 12. The shaft 16 is secured so that there is no relative motion between the shaft and the throttle body 12. The drive mechanism 26 includes an electric motor 28 and a gear assembly 30, which are housed within the central bore 34 of the blade 14. In this example, the motor 28 and the gear assembly 30 receive the shaft 16. The drive mechanism 26 causes the blade to rotate about the shaft 16. Otherwise, the function and operation of the example of FIG. 6 resembles that of the embodiment shown in FIGS. 1 through 5.

The diameter of the motor 28 is in the range of 10 mm to 25 mm and the enlarged section (defining the bore 34) preferably has a wall thickness of 1 mm to 3 mm.

The air passage 18 is defined by a third dimension D3. This air flow dimension D3 preferably is increased relative to conventional dimensions to accommodate the increased size of the enlarged section of the blade 14 so that an adequate amount of air is allowed to flow through the passage 18 when the blade 14 is in an open position. For example, a typical 52 mm bore diameter throttle body will have a predetermined air flow area "A" that is partially obstructed by the blade 14 and a conventional shaft that supports the blade. If the shaft is 10 mm in diameter, the air flow area A at the maximum airflow position is equal to the shaft diameter Ds times D3 subtracted from the quantity of pi times the third diameter squared divided by four (A= (BD32/4)−(D3*Ds)).

To obtain an equivalent flow area with a blade 14 that has an enlarged center section (assuming the motor has an 18 mm diameter and the wall thickness is 1.5 mm around the motor 28) D3 will be approximately 61.5 mm, with the blade 14 having an overall 21 mm diameter "shadow area" when in the maximum airflow position (i.e., wide open throttle). The difference between these two examples is 1603.8 square millimeters for the 52 mm air passage bore D3 and 1679.45 square millimeters for the enlarged section blade design. Thus, the performance characteristics would remain relatively the same for the enlarged section blade design with only a slight increase in air passage bore size.

Figure 3:
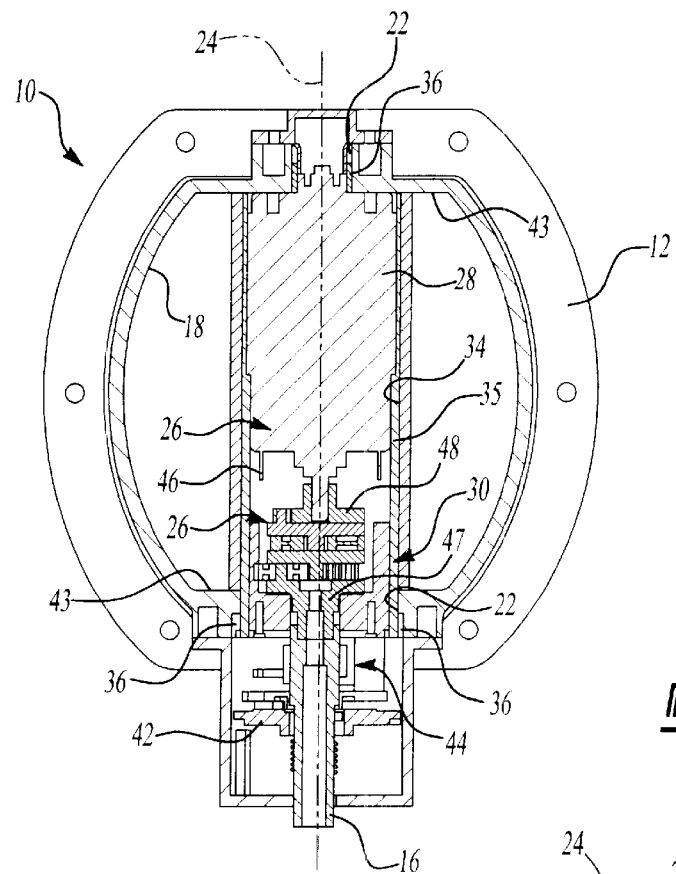
FIG. 3 is a partial cross-sectional view of the embodiment shown in FIGS. 2 and 3.

For embodiments having a non-circular opening 18, such as illustrated in FIGS. 3 and 4, the formulas to calculate area and airflow are modified. Given this description, those skilled in the art will be able to determine the best dimensions for a given configuration.

The time to fully open or close the blade 14 would be typically 60–120 milliseconds. The power supply would be nominally 12 volts and maximal torque on the blade at motor stall would be between 0.5 and 2.5 Newton meters. Durability of the assembly is expected to last several million cycles of moving between open and closed positions.

The improved blade design is lower in cost than existing spur gear and motor designs and allows smaller motors and gears to be used, which reduces the overall weight. The integration of the driving mechanism into the blade provides a modular design where one blade interior assembly can be made for several different air passage bore geometry sizes. When used in combination with a plastic throttle body, the air flow path can be adapted to suit an extremely wide range of air flow requirements all with the same modular driving mechanism.

The subject invention provides a drive assembly 26 that is mounted within a throttle blade 14 for controlling the rotational movement of the blade 14 within a throttle body 12. The compact drive mechanism 26 can be utilized in a vehicle with or without electronic throttle control or can be utilized in an electric vehicle, hybrid vehicle, or other alternatively powered vehicle. The mounting of the drive assembly within the blade eliminates the need to provide separate exterior mounting of such components on the throttle body. This provides a more modular design that decreases assembly time and cost.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A throttle assembly comprising:
   a throttle body having an airflow passage defining a longitudinal axis and an axis of rotation that is transverse to said longitudinal axis;
   a throttle blade supported for rotation about said axis of rotation and within said airflow passage between a maximum airflow position and a minimum airflow position; and
   a drive mechanism including a motor and geardrive mounted within said throttle blade for moving said throttle blade between said maximum and minimum airflow positions.

2. An assembly according to claim 1 wherein said throttle blade includes a central bore for receiving said motor and geardrive.

3. An assembly according to claim 1 including a position sensor mounted within said blade for monitoring the position of said blade relative to said body.

4. An assembly according to claim 1 including at least one bearing assembly for mounting said blade for rotation with respect to said body.

5. An assembly according to claim 1 including a shaft that is fixedly mounted to said throttle body and wherein said gear assembly is positioned between said motor and said shaft.

6. An assembly according to claim 1 wherein the drive mechanism is supported within a tube that is received within a portion of said blade.

7. An assembly according to claim 1 wherein said geardrive includes a sun gear driven by said motor, a plurality of planet gears in driving engagement with said sun gear, and a ring gear in driving engagement with said planet gears for rotating said throttle blade.

8. An assembly according to claim 7 wherein said sun gear comprises an output plate coupled to said motor.

9. A method for driving a throttle blade between maximum and minimum airflow positions comprising the steps of:
   (a) providing a throttle body with an airflow passage defining a longitudinal axis and an axis of rotation that is transverse to the longitudinal axis;
   (b) mounting a throttle blade for rotation about the axis of rotation;
   (c) securing a drive mechanism including a motor and geardrive at least partially within the throttle blade; and
   (d) driving the blade between the maximum and minimum airflow positions using the drive mechanism.

10. A method according to claim 9 including the step of sensing the position of the blade relative to the throttle body.

11. A method according to claim 9 including the step of forming a central bore within the blade and installing the motor and geardrive within the bore.

12. A method according to claim 9 wherein securing the geardrive in step (c) further includes installing a planetary gear assembly within the blade to provide torque amplification.

13. A throttle assembly comprising:
    a throttle body having an airflow passage defining a longitudinal axis and an axis of rotation that is transverse to said longitudinal axis;
    a throttle blade supported for rotation about said axis of rotation between a maximum airflow position and a minimum airflow position, said throttle blade having a central bore; and
    a drive mechanism including a motor and geardrive mounted at least partially within said central bore for moving said throttle blade between said maximum and minimum airflow positions.

14. The assembly according to claim 13 wherein said motor and geardrive are concentrically mounted within said central bore.

15. The assembly according to claim 13 including a first bearing mounted near one end of said central bore and a second bearing mounted near an opposite end of said central bore for rotatably supporting said blade with respect to said body.

16. An assembly according to claim 13 including a throttle shaft that is secured to said throttle body such that there is no relative motion between said throttle shaft and said throttle body.

17. An assembly according to claim 13 wherein said blade has a predetermined thickness and said central bore defines a bore diameter that is greater than said thickness.

18. An assembly according to claim 13 including a position sensor to monitor the position of said blade relative to said body.

19. An assembly according to claim 13 wherein said geardrive includes a sun gear driven by said motor, a plurality of planet gears in driving engagement with said sun gear, and a ring gear in driving engagement with said planet gears to rotate said throttle blade.

20. An assembly according to claim 19 wherein said sun gear comprises an output plate coupled to said motor.

* * * * *